(12) United States Patent
Worrell et al.

(10) Patent No.: US 9,928,193 B2
(45) Date of Patent: Mar. 27, 2018

(54) DISTRIBUTED TIMER SUBSYSTEM

(71) Applicant: Cavium, Inc., San Jose, CA (US)

(72) Inventors: Frank Worrell, San Jose, CA (US); Bryan W. Chin, San Diego, CA (US)

(73) Assignee: Cavium, Inc., San Jose, CA (US)

( * ) Notice: Subject to any disclaimer, the term of this patent is extended or adjusted under 35 U.S.C. 154(b) by 476 days.

(21) Appl. No.: 14/541,769

(22) Filed: Nov. 14, 2014

(65) Prior Publication Data

US 2016/0140066 A1    May 19, 2016

(51) Int. Cl.
*G06F 1/12*    (2006.01)
*G06F 13/364*  (2006.01)
*G06F 13/42*   (2006.01)

(52) U.S. Cl.
CPC .............. *G06F 13/364* (2013.01); *G06F 1/12* (2013.01); *G06F 13/4282* (2013.01); *G06F 13/4291* (2013.01)

(58) Field of Classification Search
CPC ................................. G06F 1/14; G06F 1/3203
USPC ......................................................... 710/301
See application file for complete search history.

(56) References Cited

U.S. PATENT DOCUMENTS

| | | | | |
|---|---|---|---|---|
| 7,770,034 B2* | 8/2010 | Nanja | .................... | G06F 1/3203 713/300 |
| 2004/0117682 A1* | 6/2004 | Xu | ............................ | G06F 1/14 713/400 |
| 2012/0089815 A1* | 4/2012 | Cardinell | ................... | G06F 1/14 712/31 |
| 2013/0031284 A1* | 1/2013 | Yun | ........................ | G06F 1/3237 710/105 |
| 2014/0281036 A1* | 9/2014 | Cutler | ................. | H04L 29/0854 709/248 |

\* cited by examiner

*Primary Examiner* — Titus Wong
(74) *Attorney, Agent, or Firm* — pkalousek.ip

(57) ABSTRACT

A silicon device configured to distribute a global timer value over a single serial bus to a plurality of processing elements that are disposed on the silicon device and that are coupled to the serial bus. Each of the processing elements comprises a slave timer. Upon receipt of the global timer value, the processing elements synchronize their respective slave timers with the global timer value. After the timers are synchronized, the global timer sends periodic increment signals to each of the processing elements. Upon receipt of the increment signals, the processing elements update their respective slave timers.

9 Claims, 2 Drawing Sheets

DISTRIBUTED TIMER SUBSYSTEM

CROSS-REFERENCE TO RELATED APPLICATIONS

The present application is related to application Ser. No. 14/542,065, entitled "DISTRIBUTED TIMER SUBSYSTEM ACROSS MULTIPLE DEVICES," filed DATE, assigned to the assignee hereof and hereby expressly incorporated by reference in its entirety.

FIELD

The invention disclosed herein generally relates to timer synchronization and more particularly to apparatuses, systems, and methods for distributing a common timer value to a plurality of processing elements disposed on a single silicon device.

BACKGROUND

Many of today's computing devices (e.g., laptop computers, desktop computers, smartphones, tablets, and servers) utilize processors that conform to an instruction set architecture known commercially as the ARM™ (Advanced RISC Machines) architecture. ARM processors may have multiple processing elements located on a single device (e.g., processor). According to the ARM architecture, when a device has multiple processing elements, each processing element must have access to a global system counter (e.g., timer). Such a requirement ensures that all of the processing elements have a consistent notion of time.

In some current systems that have multiple processing elements (e.g., cores) on a single device, each of the processing elements has a separate, dedicated bus that is used to send the global timer value to that particular processing element, and each time the global timer value is updated for the processing elements, the new global timer value is sent again over each of the dedicated buses. However, such a configuration can cause problems when a large number of processing elements are present on the single device.

SUMMARY

A silicon device is configured to distribute a global timer value over a single serial bus to a plurality of processing elements that are disposed on the silicon device and that are coupled to the serial bus. Each of the processing elements comprises a slave timer. Upon receipt of the global timer value, the processing elements synchronize their respective slave timers with the global timer value. After the timers are synchronized, the global timer sends periodic increment signals to each of the processing elements. Upon receipt of the increment signals, the processing elements update their respective slave timers.

In some instances, the global timer and the processing elements operate in different clock domains. In these cases, clock domain crossing circuitry is provided to transform the global timer value between the different clock domains. In other instances, a feedback mechanism may be provided so that the global timer can rectify any discrepancies between the global timer value and the timer value being sent to, or maintained by, the slave timers.

DETAILED DESCRIPTION

Figure 1:
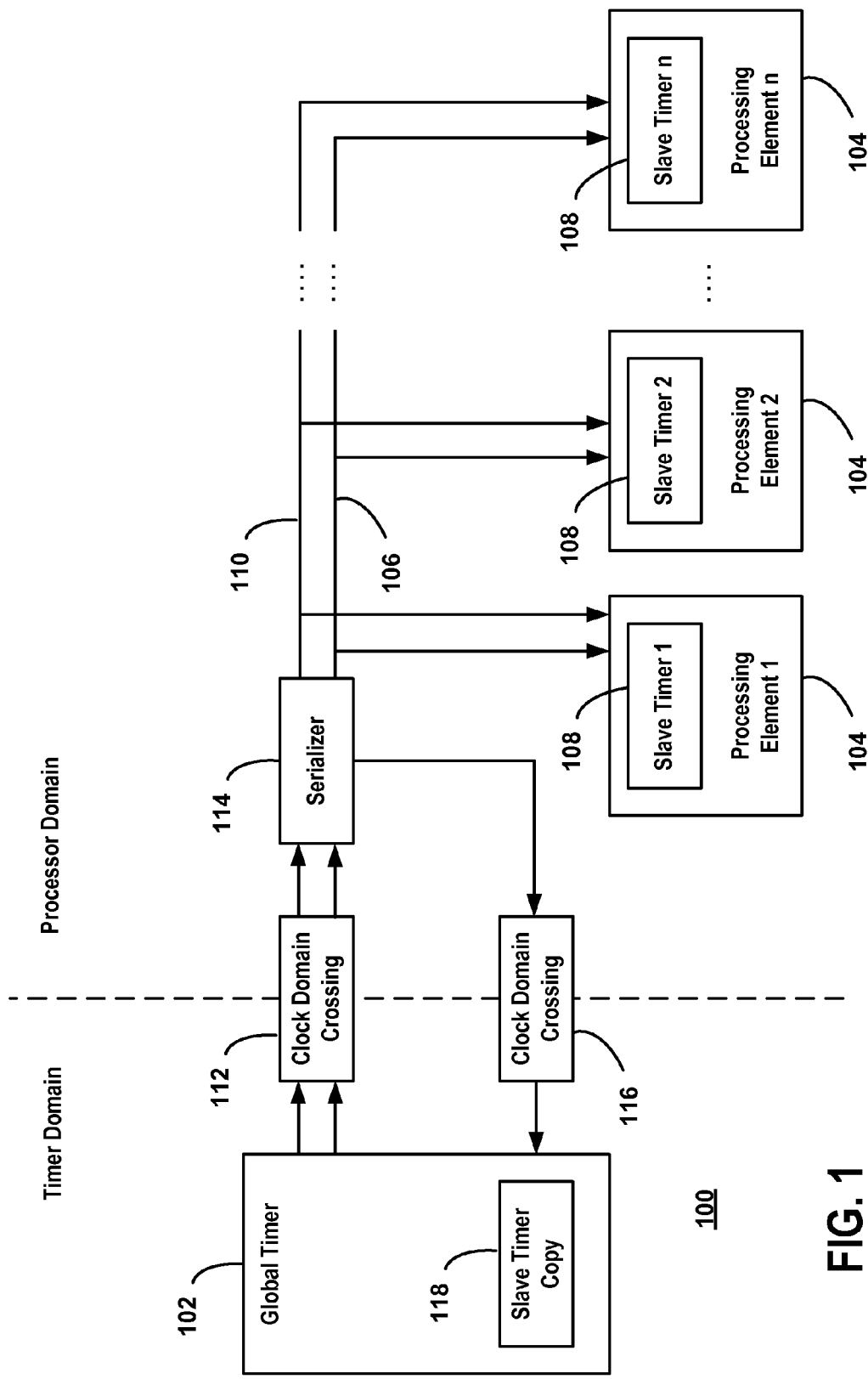
FIG. 1 is an illustration showing logical blocks that demonstrate how a single silicon device utilizes a serial bus to distribute a global timer value to a plurality of processing elements disposed on the silicon device.

FIG. 1 is an illustration showing logical blocks that demonstrate how a single silicon device utilizes a single serial bus to distribute a global timer value to a plurality of processing elements disposed on the silicon device. For the example of FIG. 1, the single silicon device 100 is configured in accordance with an Advanced RISC Machines™ (ARM) architecture. The silicon device 100 shown in FIG. 1 may also be referred to herein as an ARM processor or chip.

The silicon device 100 comprises a global timer 102 that maintains a global timer value. The silicon device 100 also comprises a plurality of processing elements 104. For the example of FIG. 1, the processing elements 104 are processing cores. The silicon device 100 can have any number, n, of processing elements 104. However, in some instances, the silicon device 100 may have 48 processing elements 104.

In order that the processing elements 104 have a consistent notion of time (e.g., with each other and with the global timer 102), the global timer 102 distributes a global timer value to each processing element 104. More specifically, the global timer 102 transmits the global timer value to each of the processing elements 104 over the serial bus 106, which is coupled to the global timer 102 and to each of the processing elements 104. Each of the processing elements 104 comprises a slave timer 108.

Upon receiving the global timer value over the serial bus 106, each of the processing elements 104 synchronizes their respective slave timers 108 with the global timer value. When it is time to update the slave timers 108, the global timer 102 sends an increment signal over line 110. The increment signal is generally much smaller in size than the size of the global timer value. For example, the increment signal could be as small as a single bit, indicating that each of the slave timers 108 should be incremented. In operation, the increment signal is sent frequently enough such that software running on each of the processing elements 104 will always have a slave timer 108 that is a valid representation of the global timer.

In this regard, the global timer 102 operates in a first clock domain in the example shown in FIG. 1. Here, the first clock domain is referred to as the "Timer Domain." Time may be measured in the Timer Domain in any unit, such as seconds, milliseconds, microseconds, or in a relative sense, such as cycles of a repeating clock function. Just as the global timer 102 operates in a first clock domain, the processing elements 104 operate in a second clock domain referred to as the "Processor Domain." Time may be measured in the Processor Domain in any unit, such as seconds, milliseconds, microseconds, or in a relative sense, such as cycles of a repeating clock function. In some instances, the Timer Domain and the Processor Domain may be synchronized. In such instances, no clock domain crossing circuitry is necessary. In other instances, any difference in phase and/or frequency between the Timer Domain and the Processor Domain must be taken into account.

For example, when the first clock domain and the second clock domain are not synchronized, the global timer value must be transformed from the first clock domain to the second clock domain. This is accomplished in FIG. 1 by first clock domain crossing circuitry 112.

Once the global timer value is transformed by the first clock domain crossing circuitry 112 into the second clock domain, the serializer 114 translates the transformed global timer value into a format that can be transmitted across the serial bus 106 to the processing elements 104. Although not explicitly shown in FIG. 1, each processing element 104 includes a deserializer to reconstruct the global timer value from the signal received over the serial bus 106.

The second clock domain crossing circuitry 116 issues a command packet instructing the global timer 102 to either "load" the most recently broadcast global timer value into the slave timer copy 118 or to "increment" the value contained in the slave timer copy 118. This command packet can be represented by two bits—a valid bit and a command bit. When the command is valid, the second bit indicates that the slave timer copy 118 should either be incremented or loaded with the most recently broadcast global timer value. Since the most recently broadcast global timer value is known within the global timer 102, the serializer 114 need only send the command packet through the clock domain crossing 116.

By maintaining the slave timer copy 118, the global timer 102 can represent the same value to software when reading from the slave timer copy 118 as if the software had read directly from the slave timers 108 contained in each of the processing elements 104. Synchronization of these values within the resolution of software observability is guaranteed by design. That is, the design takes into account the necessary delays introduced by the clock domain crossings and delays in the serializer 114 and busses 110 and 106.

Figure 2:
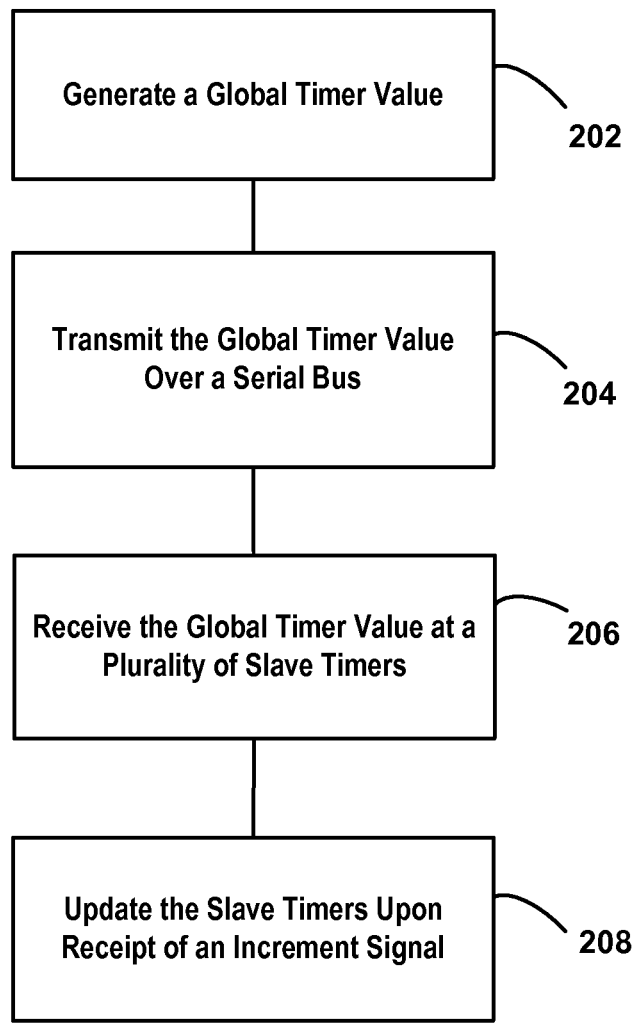
FIG. 2 is a flowchart showing a method of operating the device shown in FIG. 1.

FIG. 2 is a flowchart showing a method of operating the device shown in FIG. 1. The method begins with a global timer generating a global timer value at step 202. In some instances, the global timer obtains a global timer value from a superior time reference such as a Global Positioning System (GPS) atomic clock. In other instances, the global timer may obtain its global timer value from a system clock. In still other instances, software can write a new global timer value into the global timer. The global timer value may also be adjusted by changing the rate at which the global timer is updated/incremented or by simply writing a new global timer value into the global timer.

At step 204, the global timer value is transmitted over a serial bus that is coupled to the global timer. As shown in the example of FIG. 1, a serializer is used to translate the global timer value into a format that can be transmitted across the serial bus. In some instances, the global timer value is broadcast whenever the global timer is written or updated. The global timer value may also be broadcast every 1024 cycles so that the slave timers in any powered down processors are automatically reloaded within 1024 cycles of powering up. The broadcasting of the global timer value (e.g., either periodically or upon updating) is independent of the increment signal sent over line 110.

At step 206, the global timer value is received at a plurality of processing elements that are also coupled to the serial bus. Each of the processing elements comprises a slave timer, and upon receipt of the global timer value, each of the processing elements synchronizes their respective slave timers with the global timer value. At step 208, each of the slave timers are updated upon receiving an increment signal sent by the global timer. In operation, the increment signal is sent frequently enough such that software running on each of the processing elements will always have a slave timer that is a valid representation of the global timer.

Although not shown in FIG. 2, the method may also include transforming the global timer value from a first clock domain to a second clock domain. As mentioned above, in both the first and second clock domains, time may be measured in any unit, such as seconds, milliseconds, microseconds, or in a relative sense, such as cycles of a repeating clock function.

The functionality of the systems, devices, and their respective components, as well as any method steps and blocks described herein may be implemented in hardware or a combination of hardware and software or firmware executed by a processor. The software/firmware may be one or more programs having sets of instructions (e.g., code segments) executable by one or more digital circuits or processors, such as microprocessors, DSPs, embedded controllers, or intellectual property (IP) cores. If implemented in software/firmware, the instructions or code may be stored on one or more computer-readable media, such as a solid-state memory. Computer-readable medium includes any suitable computer storage medium. A storage medium may be any available medium that can be accessed by a computer. By way of example, and not limitation, such computer-readable medium can comprise RAM, ROM, EEPROM, NAND/NOR Flash, CD-ROM, or other solid-state storage, optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

The various embodiments described herein include a non-volatile, non-transitory computer readable medium such as, but not limited to, a server memory, CD, DVD, or other non-volatile memory that stores code (i.e. executable instructions) that may be executed by one or more processors of a manufacturing process. As such, an integrated circuit having the components, logic, etc. described herein may be manufactured by processing such code, examples of which include, but are not limited to, hardware description language (HDL) instructions and/or data, a Netlist, or some other descriptive language used in an electronic design automation (EDA) system such as an integrated circuit fabrication system. Thus one or more processors of a manufacturing system may execute such executable instructions by reading the computer readable medium to setup manufacturing of an integrated circuit having the features and functions, and being able to perform the methods of operation, of the various embodiments herein described.

Other embodiments and modifications of the methods, devices, systems and apparatuses described above will occur readily to those of ordinary skill in the art in view of these teachings. Thus, the foregoing description is illustrative and not restrictive. The invention is to be limited only by the following claims, which cover all such other embodiments and modifications, when viewed in conjunction with the above specification and accompanying drawings. The scope of the invention should, therefore, not be limited to the above description, but instead should be determined with reference to the appended claims along with their full scope of equivalents.

What is claimed is:

1. A single silicon device that is configured in accordance with an Advanced RISC Machines™ (ARM) architecture, the silicon device comprising:
   a global timer;
   a serial bus coupled to the global timer; and
   a plurality of processing elements coupled to the serial bus, each of the plurality of processing elements comprising a slave timer configured to synchronize the respective slave timer with a timer value from the global timer upon receipt of the timer value from the global timer over the serial bus; and
   each of the plurality of processing elements also configured to update a timer value of each of their respective slave timers upon receipt of an update/increment signal over the serial bus.

2. The single silicon device of claim 1, wherein the global timer comprises:
   a memory in the global timer configured to store a copy of the timer value of the slave timers.

3. The single silicon device of claim 1, wherein the global timer operates in a first clock domain and the slave timers operate in a second clock domain.

4. The single silicon device of claim 3, further comprising:
   first clock domain crossing circuitry configured to transform the timer value from the global timer from the first clock domain to the second clock domain.

5. A method performed in a single silicon device that is configured in accordance with an Advanced RISC Machines™ (ARM) architecture, the method comprising:
   generating a global timer value;
   transmitting the global timer value over a serial bus;
   receiving, at a plurality of slave timers coupled to the serial bus, the global timer value;
   synchronizing each respective slave timer with the received the global timer value upon receipt of the timer value from the global timer; and
   updating a timer value of each of the slave timers upon receipt of an update/increment signal over the serial bus.

6. The method of claim 5, further comprising:
   maintaining a copy of the timer value of the slave timers in the global timer.

7. The method of claim 5, further comprising:
   transforming the global timer value from a first clock domain to a second clock domain.

8. A single silicon device that is configured in accordance with an Advanced RISC Machines™ (ARM) architecture, the silicon device comprising:
   a global timer;
   a serial bus coupled to the global timer;
   a plurality of processing elements coupled to the serial bus, each of the plurality of processing elements comprising a slave timer configured to synchronize the respective slave timer with a timer value from the global timer upon receipt of the timer value from the global timer over the serial bus; and
   each of the plurality of processing elements also configured to update a timer value of each of their respective slave timers upon receipt of an update/increment signal;
   first clock domain crossing circuitry configured to transform the timer value from the global timer from a first clock domain to a second clock domain; and
   a memory in the global timer configured to maintain a copy of the timer value of the slave timers.

9. A non-transient computer-readable memory comprising:
   executable instructions that when executed by at least one processor of an electronic design automation system (or integrated circuit fabrication system), that when executed cause the at least one processor to:
   provide a global timer;
   provide a serial bus coupled to the global timer; and
   provide a plurality of processing elements coupled to the serial bus, each of the plurality of processing elements comprising a slave timer configured to synchronize the respective slave timer with a timer value from the global timer upon receipt of the timer value from the global timer over the serial bus; and
   each of the plurality of processing elements also configured to update a timer value of each of their respective slave timers upon receipt of an update/increment signal over the serial bus.

* * * * *